United States Patent
Liu

(10) Patent No.: US 8,280,464 B2
(45) Date of Patent: Oct. 2, 2012

(54) HANDHELD ELECTRONIC DEVICE

(75) Inventor: Yi-Ching Liu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 173 days.

(21) Appl. No.: 12/635,669

(22) Filed: Dec. 10, 2009

(65) Prior Publication Data

US 2011/0018407 A1 Jan. 27, 2011

(30) Foreign Application Priority Data

Jul. 21, 2009 (TW) .............................. 98124589 A

(51) Int. Cl.
*H04M 1/00* (2006.01)

(52) U.S. Cl. ................................ 455/575.3; 379/433.12

(58) Field of Classification Search .................. 455/66.1, 455/90.3, 550.1, 556.2, 566, 575.1, 575.3, 455/575.4; 361/679.09, 679.12, 679.26, 361/679.27, 679.28, 679.3; 379/433.1, 433.12, 379/433.13

See application file for complete search history.

(56) References Cited

U.S. PATENT DOCUMENTS

| | | | |
|---|---|---|---|
| 6,980,840 B2 * | 12/2005 | Kim et al. .................. | 455/575.4 |
| 7,065,835 B2 * | 6/2006 | Kuramochi .................. | 16/357 |
| 7,136,688 B2 * | 11/2006 | Jung et al. ................... | 455/575.4 |
| 7,286,862 B2 * | 10/2007 | Lee et al. .................... | 455/575.4 |
| 7,448,872 B2 * | 11/2008 | Im ................................ | 439/10 |
| 7,561,414 B2 * | 7/2009 | Li et al. ...................... | 361/679.26 |
| 7,599,723 B2 * | 10/2009 | Lee et al. .................... | 455/575.4 |
| 7,822,447 B2 * | 10/2010 | Kim ............................ | 455/575.4 |
| 7,885,693 B2 * | 2/2011 | Park et al. ................... | 455/575.4 |
| 2007/0128904 A1 * | 6/2007 | Kang et al. .................. | 439/159 |
| 2007/0197270 A1 | 8/2007 | Kim | |
| 2008/0307607 A1 | 12/2008 | Kim et al. | |

FOREIGN PATENT DOCUMENTS

| | | |
|---|---|---|
| CN | 101051847 | 10/2007 |
| EP | 1843559 | 10/2007 |
| TW | 200911085 | 3/2009 |
| WO | 2006106374 | 10/2006 |
| WO | 2008080425 | 7/2008 |

OTHER PUBLICATIONS

"Search Report of European Counterpart Application" issued on Mar. 5, 2010, p. 1-p. 4.
"Office Action of European Counterpart Application" issued on Mar. 19, 2010, p. 1-p. 7.
"Office Action of Taiwan Counterpart Application", issued on Feb. 8, 2012, p. 1-p. 10.

* cited by examiner

*Primary Examiner* — Meless N Zewdu
*Assistant Examiner* — Gerald Oliver
(74) *Attorney, Agent, or Firm* — Jianq Chyun IP Office

(57) ABSTRACT

A handheld electronic device including a first body, a second body and a moving mechanism is provided. The second body is stacked under the first body. A side of the second body facing the first body has a concave portion. The moving mechanism includes a first sliding member, a second sliding member and an elevating mechanism. The first sliding member is fixed to the first body. The second sliding member is slidingly disposed at the first sliding member. The elevating mechanism is connected between the second body and the second sliding member. After the first sliding member drives the first body to shift relatively to the second body to reach the concave portion, the first body compresses the elevating mechanism and enters the concave portion.

12 Claims, 4 Drawing Sheets

HANDHELD ELECTRONIC DEVICE

CROSS-REFERENCE TO RELATED APPLICATION

This application claims the priority benefit of Taiwan application serial No. 98124589, filed on Jul. 21, 2009. The entirety of the above-mentioned patent application is hereby incorporated by reference herein and made a part of this specification.

BACKGROUND OF THE INVENTION

1. Field of the Invention

The present application relates to an electronic device. More particularly, the present application relates to a handheld electronic device.

2. Description of Related Art

Along with development of information technology, obtaining required information from an electronic device becomes easier. On the other hand, with development of industrial engineering, various electronic devices have a general trend of lightness, slimness, shortness and smallness, and since the electronic devices have a feature and advantage of portability, they are widely used in people's daily life.

Taking mobile phones as an example, to meet a requirement of portability and different preferences and demands, besides a conventional bar-type mobile phone, the mobile phones further include clamshell mobile phones, swivel mobile phones, and slide mobile phones, etc. Taking the slide mobile phone as an example, an upper body thereof is stacked over and can be slid relatively to a lower body thereof, so as to present different operation modes of open and close. Stacking the two bodies avails reducing a whole size of the mobile phone, and the two bodies can be spread during a specific operation mode.

Taking a two-layer slide phone having a keyboard as an example, an operation method thereof is as follows. A display screen of the slide phone can be slid to a side of the keyboard to expose the keyboard, so as to facilitate a user to use the keyboard. However, in case of such design, after the display screen is slid relatively to the keyboard, a height difference is formed there between to present a step profile, so that an appearance of the slide phone is lack of integrity. Moreover, after the display screen is slid relatively to the keyboard, a sliding groove on the backside of the display screen is generally exposed to influence the appearance of the slide phone.

SUMMARY OF THE INVENTION

The present application is directed to a handheld electronic device having an integral and concise appearance.

The present application provides a handheld electronic device including a first body, a second body and a moving mechanism. The second body is stacked under the first body. A side of the second body facing the first body has a concave portion. The moving mechanism includes a first sliding member, a second sliding member and an elevating mechanism. The first sliding member is fixed to the first body. The second sliding member is slidingly disposed at the first sliding member. The elevating mechanism is connected between the second body and the second sliding member. After the first sliding member is slid relatively to the second sliding member to drive the first body to shift relatively to the second body to reach the concave portion, the first body compresses the elevating mechanism and enters the concave portion.

Accordingly, after the first body is slid relatively to the second body, the first body enters the concave portion, so that the first body and the second body are expanded to maintain integrity of the appearance of the handheld electronic device. Moreover, relative sliding between the first body and the second body is driven by the first sliding member and the second sliding member, so that configuring of a sliding groove on the first body or the second body is unnecessary, and therefore the appearance of the handheld electronic device is concise.

In order to make the aforementioned and other features and advantages of the present application comprehensible, several exemplary embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF THE EMBODIMENTS

Figure 1:
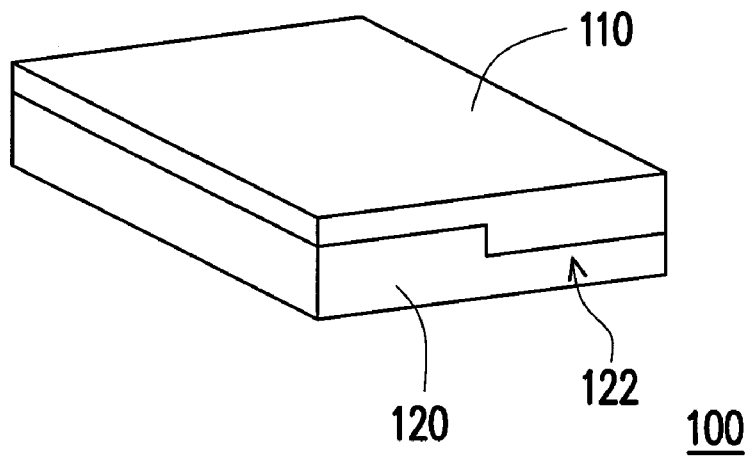
FIG. 1 is a three-dimensional diagram of a handheld electronic device according to an embodiment of the present application.

Reference will now be made in detail to the present preferred embodiments of the application, examples of which are illustrated in the accompanying drawings. Wherever possible, the same reference numbers are used in the drawings and the description to refer to the same or like parts.

Figure 2:
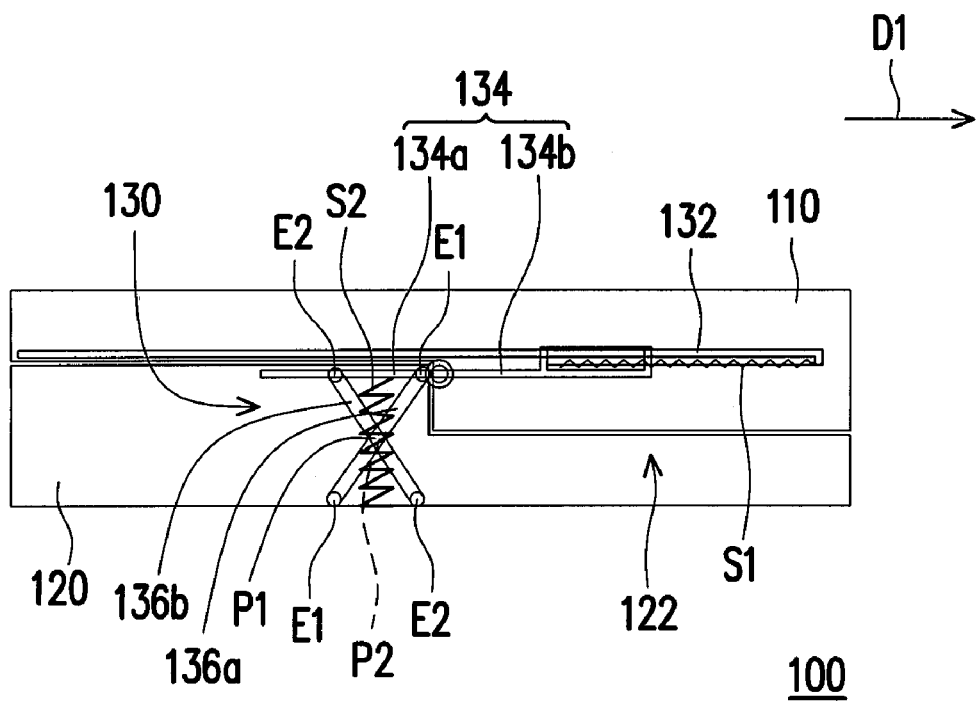
FIG. 2 is a side perspective view of a handheld electronic device of FIG. 1.

FIG. 1 is a three-dimensional diagram of a handheld electronic device according to an embodiment of the present application. FIG. 2 is a side perspective view of the handheld electronic device of FIG. 1. Referring to FIG. 1 and FIG. 2, the handheld electronic device 100 includes a first body 110, a second body 120 and a moving mechanism 130. The second body 120 is stacked under the first body 110, wherein a side of the second body 120 facing the first body 110 has a concave portion 122. In the present embodiment, the first body 110 and the second body 120, for example, respectively have a display screen and a keyboard of the handheld electronic device 100.

The moving mechanism 130 includes a first sliding member 132, a second sliding member 134 and an elevating mechanism 136. The first sliding member 132 is fixed to the first body 110. The second sliding member 134 is slidingly disposed at the first sliding member 132. The elevating mechanism 136 is connected between the second body 120 and the second sliding member 134. After the first sliding member 132 is slid relatively to the second sliding member 134 to drive the first body 110 to shift relatively to the second body 120 to reach the concave portion 122, the first body 110 compresses the elevating mechanism 136 and enters the concave portion 122, such that a top surface of the first body 110 and a top surface of the second body 120 are substantially coplanar.

An operation flow of the handheld electronic device 100 is described in detail with reference of FIG. 2, FIG. 3A to FIG. 3C.

Figure 3A:
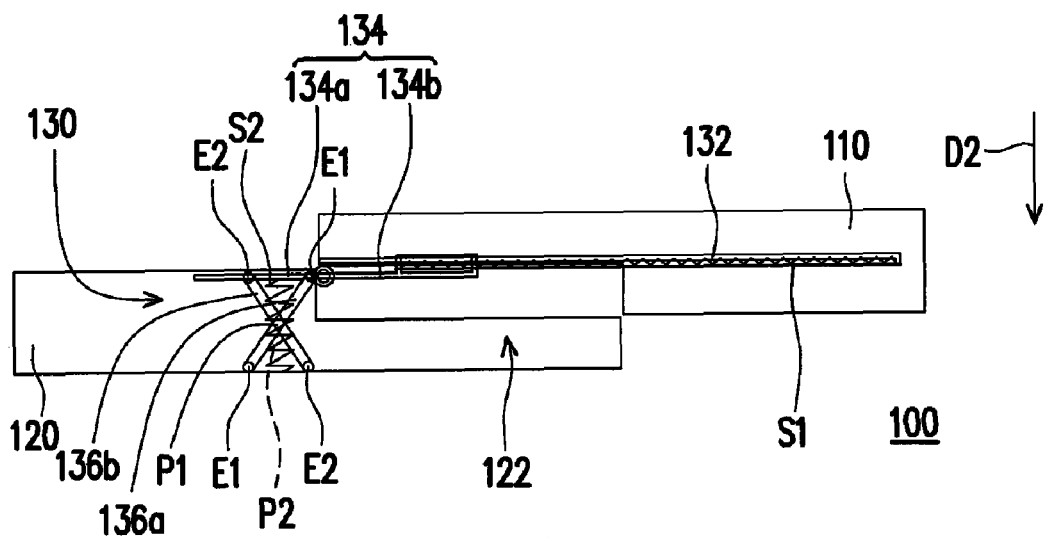
FIGS. 3A-3C are diagrams illustrating an operation flow of a handheld electronic device of FIG. 1.
Figure 3B:
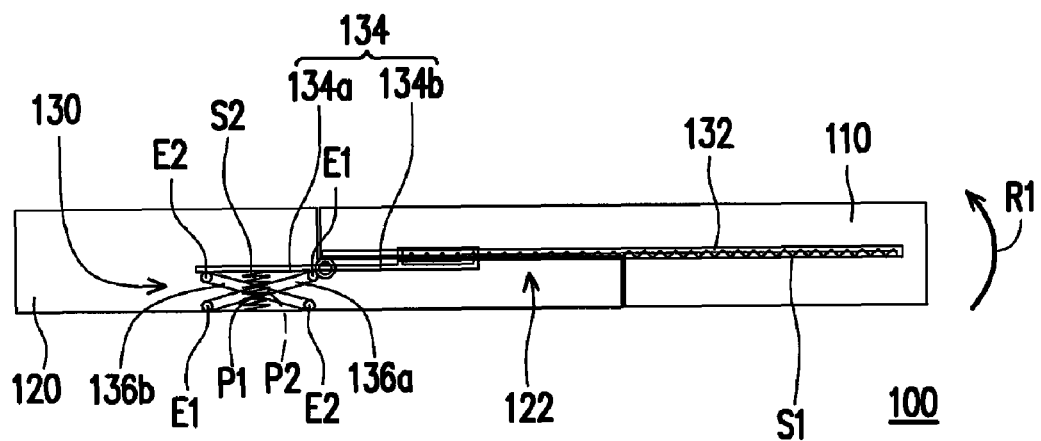
Figure 3C:
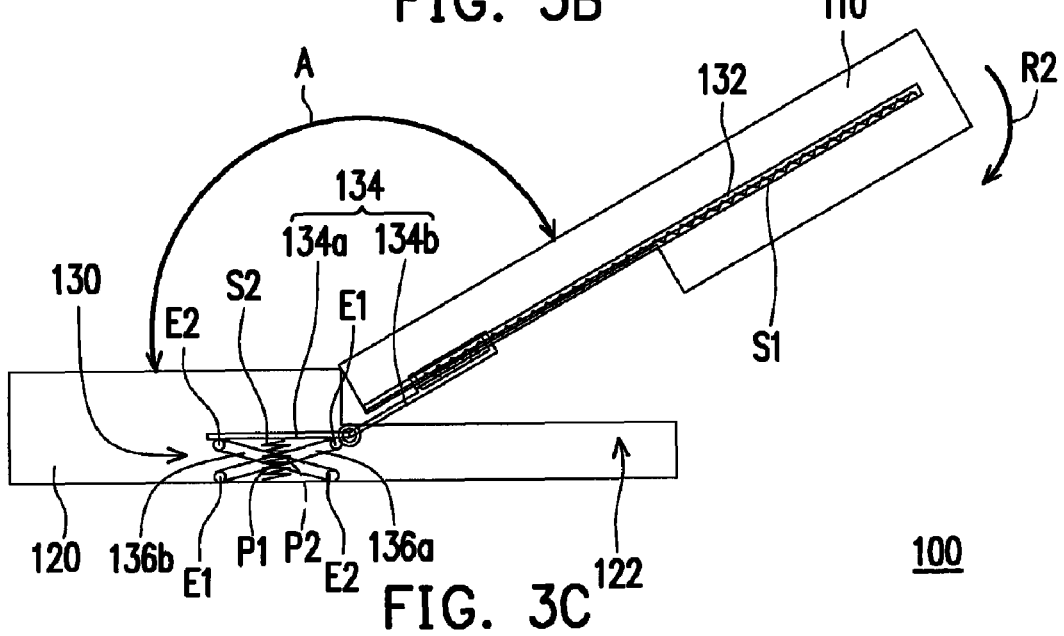

FIGS. 3A-3C are diagrams illustrating an operation flow of the handheld electronic device of FIG. 1. Referring to FIG. 2, when a user wants to operate the keyboard, the user pushes the first body 110 to a position shown in FIG. 3A along a direction D1. During such process, the first sliding member 132 is slid relatively to the second sliding member 134 to drive the first body 110 to shift relatively to the second body 120. Then, referring to FIG. 3A, the user can press down the first body 110 along a second direction D2 to compress the elevating mechanism 136, so that the first body 110 is descended to a position shown in FIG. 3B and enters the concave portion 122.

Referring to FIG. 2, in detail, the elevating mechanism 136 includes a first rod 136a and a second rod 136b. The first rod 136a has two first end parts E1 and a first pivot part P1 between the two first end parts E1, wherein the two first end parts E1 are respectively coupled to the second sliding member 134 and the second body 120. The second rod 136b has two second end parts E2 and a second pivot part P2 between the two second end parts E2, wherein the two second end parts E2 are respectively coupled to the second sliding member 134 and the second body 120, and the second pivot part P2 is pivotally connected to the first pivot part P1. During a process when the elevating mechanism 136 is compressed from a state shown in FIG. 3A to a state shown in FIG. 3B, the first rod 136a and the second rod 136b are pivotally rotated through the first pivot part P1 and the second pivot part P2, so that the elevating mechanism 136 can be smoothly actuated.

Moreover, the second sliding member 134 includes a first portion 134a and a second portion 134b. The first portion 134a is connected to the elevating mechanism 136. The second portion 134b is pivotally connected to the first portion 134a. Therefore, after the first body 110 enters the concave portion 122 (shown as FIG. 3B), the user can wrench the first body 110, and the second portion 134b is pivotally rotated relatively to the first portion 134a to drive the first body 110 rotating relatively to the second body 120 along a direction R1 to a state shown as FIG. 3C, so that an angle A is formed between the top surface of the first body 110 and the top surface of the second body 120. In other words, the size of the angle A can be changed by rotating the first body 110 relatively to the second body 120, so as to adjust the display screen (the first body 110) to a suitable position for viewing.

Referring to FIG. 2, the moving mechanism 130 further includes a first elastic member S1 and a second elastic member S2. The first elastic member S1 is connected between the first sliding member 132 and the second sliding member 134. When the first sliding member 132 is slid relatively to the second sliding member 134 to drive the first body 110 to shift relatively to the second body 120 to reach the concave portion 122, the first elastic member S1 is deformed to store elastic potential energy. In detail, the first elastic member S1 of the present embodiment is, for example, a tension spring. During a process that the first body 110 is shifted from a position shown in FIG. 2 to a position shown in FIG. 3A, the first elastic member S1 is elongated to store the elastic potential energy.

The second elastic member S2 is connected between the second sliding member 134 and the second body 120. When the elevating mechanism 136 is compressed, the second elastic member S2 is deformed to store elastic potential energy. In detail, the second elastic member S2 of the present embodiment is, for example, a compression spring. During a process that the first body 110 is descended from a position shown in FIG. 3A to a position shown in FIG. 3B, the second elastic member S2 is compressed to store the elastic potential energy.

Figure 4A:
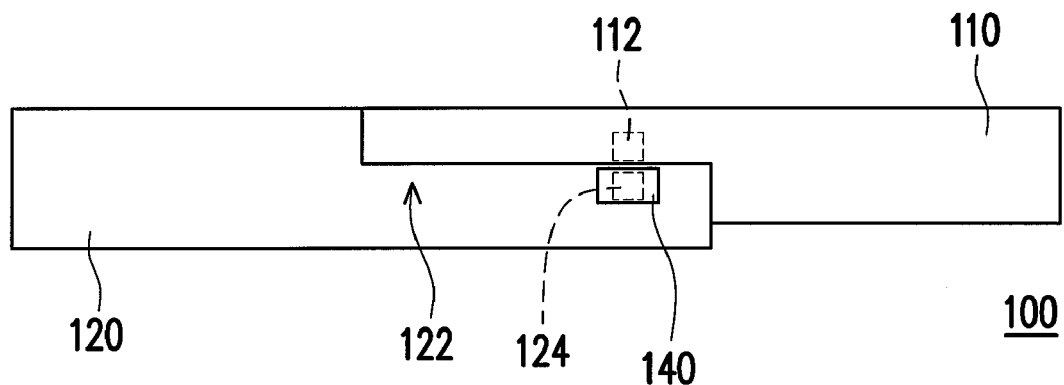
FIG. 4A and FIG. 4B are side views of a spread handheld electronic device of FIG. 1.
Figure 4B:
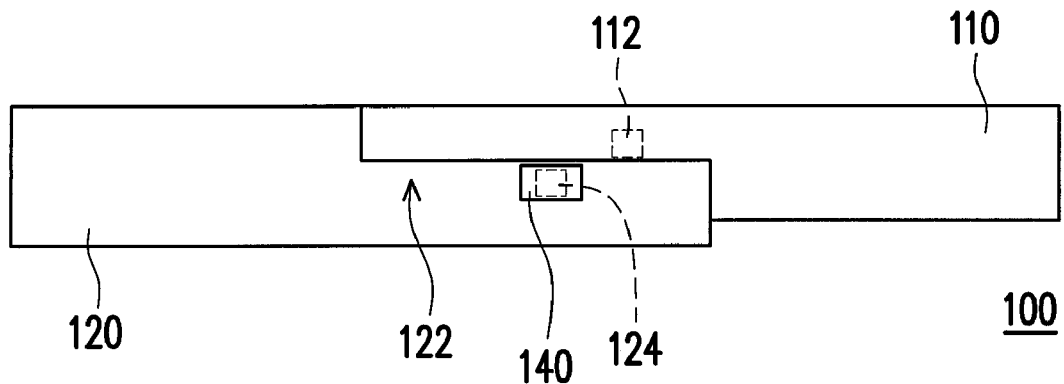

FIG. 4A and FIG. 4B are side views of a spread handheld electronic device of FIG. 1. Referring to FIG. 4A, in the present embodiment, the first body 110 has a first positioning member 112, and the second body 120 has a second positioning member 124. When the first body 110 enters the concave portion 122, the first positioning member 112 and the second positioning member 124 are mutually fixed to position the first body 110 at the concave portion 122, so as to maintain a spread state of the handheld electronic device 100. In detail, the first positioning member 112 and the second positioning member 124 are, for example, magnetic members with different polarities, and are mutually attracted according to a magnetic attraction, though the present application is not limited thereto, and in other embodiments, the first positioning member 112 and the second positioning member 124 can also be fasteners coordinating with each other, and can be mutually fixed according to a structural interference.

Moreover, in the present embodiment, the handheld electronic device 100 further includes an unlock key 140. The unlock key 140 is disposed on the second body 120 and is connected to the second positioning member 124. When the unlock key 140 is pushed to drive the second positioning member 124 to move from a position shown in FIG. 4A to a position shown in FIG. 4B, the first positioning member 112 and the second positioning member 124 are departed to unlock a fixing relation there between. However, a disposing position of the unlock key 140 is not limited by the present application, and in other embodiments, the unlock key 140 can also be disposed on the first body 110, and is connected to the first positioning member 112, so as to drive the first positioning member 112 to depart from the second positioning member 124.

Referring to FIG. 3C, when the user wants to close the handheld electronic device 100, the user wrenches the first body 110 to pivotally rotating the second portion 134b relatively to the first portion 134a, so that the first body 110 is rotated relatively to the second body 120 along a direction R2 to a state shown in FIG. 3B, and the top surface of the first body 110 and the top surface of the second body 120 are recovered to the substantial coplanar state. Thereafter, referring to FIG. 4A, the user can push the unlock key 140 to drive the second positioning member 124 to move to a position shown in FIG. 4B for departing from the first positioning member 112, so that the first positioning member 112 and the second positioning member 124 are no longer mutually fixed by the magnetic attraction. Now, the elastic potential energy of the second elastic member S2 shown in FIG. 3B is released to elevate the first body 110 to a position shown in FIG. 3A. Then, the first elastic member S1 is also released to shift the first body 110 to a position shown in FIG. 2, so as to close the first body 110 to the second body 120.

Figure 5A:
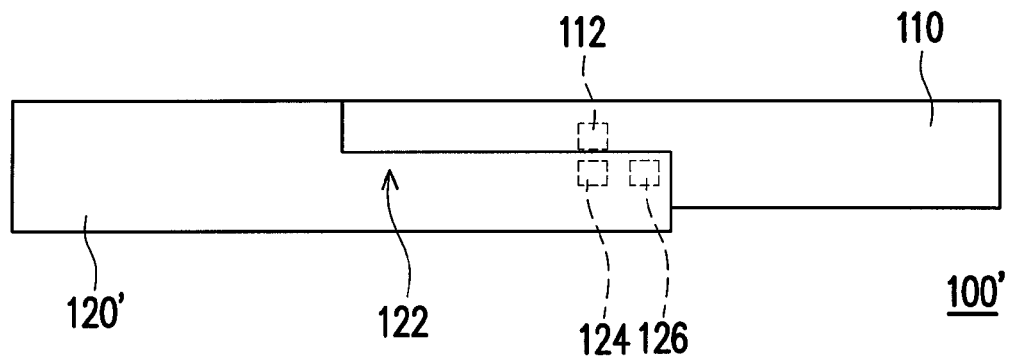
FIG. 5A and FIG. 5B are side views of a spread handheld electronic device according to another embodiment of the present application.
Figure 5B:
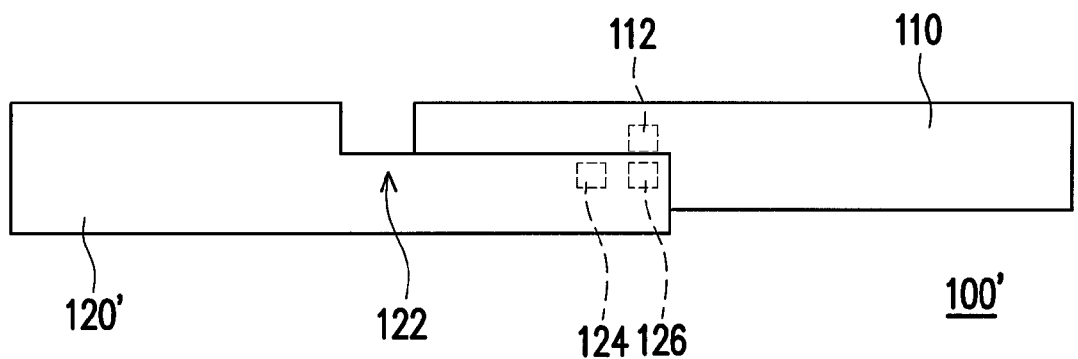

FIG. 5A and FIG. 5B are side views of a spread handheld electronic device according to another embodiment of the present application. Referring to FIG. 5A, compared to the handheld electronic device 100 of FIG. 4A, a second body 120' of the handheld electronic device 100' of the present embodiment further has a third positioning member 126. The first positioning member 112 and the third positioning member 126 are magnetic members with a same polarity. When the first body 110 is shifted relatively to the second body 120' from a position shown in FIG. 5A to a position shown in FIG. 5B, the first body 110 is departed from the concave portion 122 according to a magnetic repulsion between the first positioning member 112 and the third positioning member 126. In other words, the magnetic repulsion between the first positioning member 112 and the third positioning member 126 can function together with the elastic force of the second elastic member S2 (shown in FIG. 3B) to drive the first body 110 departing from the concave portion 122.

In summary, in the present application, after the first body is slid relatively to the second body to enter the concave portion, the first body and the second body are expanded, so that integrity of an appearance of the handheld electronic device is maintained. Relative sliding between the first body and the second body is driven by the first sliding member and the second sliding member, so that configuring of a sliding groove on the first body or the second body is unnecessary, and therefore the appearance of the handheld electronic device is more concise. Moreover, the first body can be positioned at the concave portion through magnetic members or fasteners, so as to maintain a spread state of the handheld electronic device, and an angle formed between the first body and the second body can be changed by pivotally rotating the two portions of the second sliding member, so as to adjust the display screen of the handheld electronic device to a suitable position for viewing. In addition, the first body can be reposited and closed to the second body according to the elastic force of the elastic members, so as to improve an operation convenience of the handheld electronic device.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A handheld electronic device, comprising:
    a first body;
    a second body, wherein the first body being stacked on a carrying surface of the second body, and a side of the second body facing the first body has a concave portion;
    a moving mechanism, comprising:
        a first sliding member, fixed to the first body;
        a second sliding member, slidingly disposed at the first sliding member; and
        an elevating mechanism, connected between the second body and the second sliding member, wherein after the first sliding member is slid relatively to the second sliding member to drive the first body to shift relatively to the second body to reach the concave portion, the first body is adapted to compress the elevating mechanism in a direction substantially perpendicular to the carrying surface and enter the concave portion, wherein the elevating mechanism comprises:
            a first rod, having two first end parts and a first pivot part between the two first end parts, wherein the two first end parts are respectively coupled to the second sliding member and the second body; and
            a second rod, having two second end parts and a second pivot part between the two second end parts, wherein the two second end parts are respectively coupled to the second sliding member and the second body, and the second pivot part is pivotally connected to the first pivot part, and when the elevating mechanism is compressed, the first rod and the second rod are pivotally rotated through the first pivot part and the second pivot part.

2. The handheld electronic device as claimed in claim 1, wherein the moving mechanism further comprises:
    a first elastic member, connected between the first sliding member and the second sliding member, wherein when the first sliding member is slid relatively to the second sliding member to drive the first body to shift relatively to the second body to reach the concave portion, the first elastic member is deformed to store elastic potential energy.

3. The handheld electronic device as claimed in claim 2, wherein the first elastic member is a tension spring.

4. The handheld electronic device as claimed in claim 1, wherein the moving mechanism further comprises:
    a second elastic member, connected between the second body and the second sliding member, wherein when the elevating mechanism is compressed, the second elastic member is deformed to store elastic potential energy.

5. The handheld electronic device as claimed in claim 4, wherein the second elastic member is a compression spring.

6. The handheld electronic device as claimed in claim 1, wherein the first body has a first positioning member, and the second body has a second positioning member, and when the first body enters the concave portion, the first positioning member and the second positioning member are mutually fixed to position the first body at the concave portion.

7. The handheld electronic device as claimed in claim 6, wherein the first positioning member and the second positioning member are magnetic members with different polarities, and are mutually attracted according to a magnetic attraction.

8. The handheld electronic device as claimed in claim 7, wherein the second body further has a third positioning member, the first positioning member and the third positioning member are magnetic members with a same polarity, and when the first body is shifted relatively to the second body to close the first positioning member to the third positioning member, the first body is departed from the concave portion according to a magnetic repulsion between the first positioning member and the third positioning member.

9. The handheld electronic device as claimed in claim 6, wherein the first positioning member and the second positioning member are fasteners coordinating with each other, and are mutually fixed according to a structural interference.

10. The handheld electronic device as claimed in claim 6, wherein the handheld electronic device further comprises:
    an unlock key, disposed on the first body or the second body and connected to the first positioning member or the second positioning member, wherein when the unlock key is pushed to drive the first positioning member or the second positioning member to move, the first positioning member and the second positioning member are departed to unlock a fixing relation between the first positioning member and the second positioning member.

11. The handheld electronic device as claimed in claim 1, wherein a top surface of the first body and a top surface of the second body are substantially coplanar when the first body reaches the concave portion.

12. The handheld electronic device as claimed in claim 1, wherein the second sliding member comprises:
    a first portion, connected to the elevating mechanism; and
    a second portion, pivotally connected to the first portion, wherein after the first body enters the concave portion, the second portion is pivotally rotated relatively to the first portion to drive the first body rotating relatively to the second body, so that an angle is formed between the top surface of the first body and the top surface of the second body.

* * * * *